(12) United States Patent
Sako

(10) Patent No.: US 11,169,751 B2
(45) Date of Patent: Nov. 9, 2021

(54) PRINTING APPARATUS AND PRINTING SYSTEM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/987,528

(22) Filed: Aug. 7, 2020

(65) Prior Publication Data
US 2021/0042071 A1 Feb. 11, 2021

(30) Foreign Application Priority Data

Aug. 9, 2019 (JP) .............................. JP2019-147442

(51) Int. Cl.
*G06F 15/00* (2006.01)
*G06F 3/12* (2006.01)
*G06K 1/00* (2006.01)

(52) U.S. Cl.
CPC .......... *G06F 3/1232* (2013.01); *G06F 3/1204* (2013.01); *G06F 3/1288* (2013.01); *G06F 3/1292* (2013.01)

(58) Field of Classification Search
CPC .... G06F 3/1232; G06F 3/1204; G06F 3/1288; G06F 3/1292
USPC .............................. 358/1.1, 1.15, 1.13, 1.14
See application file for complete search history.

(56) References Cited

U.S. PATENT DOCUMENTS

| | | | | |
|---|---|---|---|---|
| 2008/0253667 | A1* | 10/2008 | Shiraishi | G06F 3/1204 382/232 |
| 2013/0286428 | A1* | 10/2013 | Oleinik | H04N 1/00925 358/1.15 |
| 2014/0218762 | A1* | 8/2014 | Abe | G06F 3/1212 358/1.15 |
| 2015/0261482 | A1* | 9/2015 | Takano | G06F 3/1288 358/1.15 |

FOREIGN PATENT DOCUMENTS

JP 2014-206876 A 10/2014

* cited by examiner

*Primary Examiner* — Douglas Q Tran
(74) *Attorney, Agent, or Firm* — Canon U.S.A., Inc. IP Division

(57) ABSTRACT

A multifunction peripheral (MFP) has a function of receiving print data from a cloud print service. The MFP displays a screen related to the cloud print service to be displayed, and consequently sets a share range where a printing apparatus is shared on the cloud print service based on a user operation via the setting screen. The MFP then requests the cloud print service to change the share range where the printing apparatus is shared based on the set share range.

13 Claims, 15 Drawing Sheets

FIG.10

```
MFP102 Remote UI > Settings : Network > CloudPrint Settings          ~1000
                                                         [Edit]
CloudPrint Setting:        On
CloudPrint Registration Status
  Registration Status:   Registered          [Unregister]    ~1002
  Printer Name:          MFP102              [PrinterName Setting]  ~1003
  Share Name:                                [Share Setting]  ~1004
```
                                                              1005

```
MFP102 Remote UI > Settings : Network > CloudPrint Settings > Share Setting   ~1010
                                                         [OK]   ~1011
  Share Name:
  [SalesDev ☐]    [PlanningDev ☐]    [DevelopmentDev ☐]    ~1013
```

```
MFP102 Remote UI > Settings : Network > CloudPrint Settings > Share Setting   ~1020
                                                         [OK]   ~1021
  Share Name:                                                    ~1023
  [SalesDev ☑]    [PlanningDev ☑]    [DevelopmentDev ☐]    ~1022
```

```
MFP102 Remote UI > Settings : Network > CloudPrint Settings    ~1030
                                                         [Edit]
CloudPrint Setting:        On
CloudPrint Registration Status
  Registration Status:   Registered          [Unregister]
  Printer Name:          MFP102              [PrinterName Setting]
  Share Name: SalesDev/PlanningDev  ~1031    [Share Setting]
```

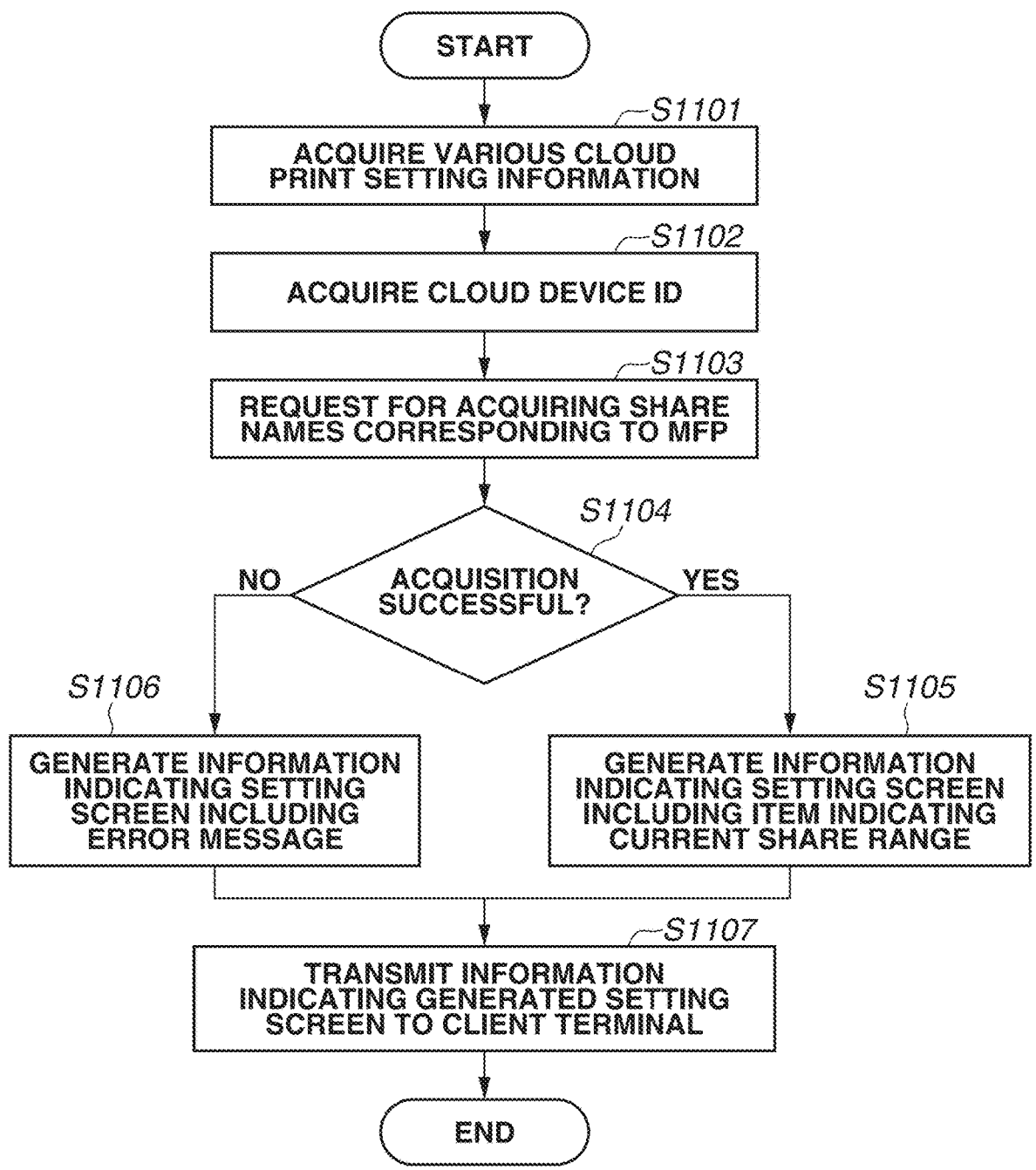

FIG.13

```
MFP102 Remote UI > Settings : Network > CloudPrint Settings          ~1300
                                                         [ Edit ]
CloudPrint Setting:        On CloudPrint Registration Status Registration Status:    Registered              [ Unregister ]
  Printer Name:           MFP102                  [ PrinterName Setting ]
  Share Name: Cannot get Share Setting from Cloud [ Share Setting ]
                    ~1031
```

```
MFP102 Remote UI > Settings : Network > CloudPrint Settings > Share Setting   ~1310
                                                         [ OK ]

Share Name: Cannot get Share Setting from Cloud ~1311
```

```
MFP102 Remote UI > Settings : Network > CloudPrint Settings          ~1320
                                                         [ Edit ]
CloudPrint Setting:        On CloudPrint Registration Status Registration Status:    Registered              [ Unregister ]
  Printer Name:           MFP102                  [ PrinterName Setting ]
  Share Name:  SalesDev                           [ Share Setting ]
               Cannot update Share Setting to Cloud
                           1321
```

FIG.15

MFP102 Remote UI > Settings : Network > CloudPrint Settings

Edit

CloudPrint Setting: On

Register is Successful.
Do you want to continue setting up to share the printer?   Yes   No Registration Status:   Registered   Unregister Printer Name:   MFP102   PrinterName Setting Share Name:   Share Setting REDIRECT FROM WEB SCREEN OFFERED BY MFP TO SHARE RANGE SETTING SCREEN FOR CLOUD PRINT SERVICE

CLOUD SERVICE (TENANT A)
SHARE RANGE SETTING FOR CLOUD PRINTERS

Share name:   OK

| SalesDev | Edit | Delete |
| PlanningDev | Edit | Delete |
| DevelopmentDev | Edit | Delete |

Add

PRINTING APPARATUS AND PRINTING SYSTEM

BACKGROUND

Field

The present disclosure relates to a printing apparatus and a printing system.

Description of the Related Art

In recent years, cloud print services in which a print job is submitted via a cloud print service and then transmitted to a printing apparatus have been widely used. In such a printing system, an administrator first registers a printing apparatus with the cloud print service that the administrator belongs to.

A user permitted to use the printing apparatus submits a print job from a client terminal to the cloud print service. The cloud print service stores the received print job. The printing apparatus acquires the print job stored in the cloud print service and then performs printing based on the print job.

Examples of the cloud print service include Google Cloud Print™ Microsoft Hybrid Cloud Print®, and Uniflow® OnLine.

A technique discussed in Japanese Patent Application Laid-Open No. 2014-206876 performs user's access right management for remote printers (also refer to as shared printers) installed in an on-premise print server. The print server disclosed in Japanese Patent Application Laid-Open No. 2014-206876 groups shared printers and assigns a share name to the shared printers. The print server provides the right to access a printer to the user based the share name instead of the printer name. When a new printer is added, the right to access the printer can be provided to a suitable user by setting a suitable share name to the printer.

With the increase in the use of cloud platforms in recent years, the number of cases where cloud platforms (e.g., AWS, Azure, and Google Cloud Platform™) are used in corporations and other organizations is also increasing. In addition, there are increasing number of cases where each platform (e.g., Google Cloud Print™) provides the user with a cloud print service to enable the user to easily perform printing.

SUMMARY

According to an aspect of the present disclosure, a printing apparatus including a function of receiving print data from a cloud print service and performing printing includes at least one memory that stores a set of instructions and at least one processor that executes the set of instructions, the set of instructions, when executed, causing the printing apparatus to perform operations comprising controlling a setting screen related to the cloud print service to be displayed, setting a share range where the printing apparatus is shared on the cloud print service based on a user operation via the setting screen, and transmitting, to the cloud print service, a request for changing the share range where the printing apparatus is shared based on the set share range.

Further features will become apparent from the following description of exemplary embodiments with reference to the attached drawings.

BRIEF DESCRIPTION OF THE DRAWINGS

FIG. 10 illustrates examples of setting screens offered to the user by the MFP.

FIG. 11 is a flowchart illustrating an example of control performed by the MFP.

FIG. 13 illustrates examples of error screens offered to the user by the MFP.

FIG. 15 is a schematic diagram illustrating a modification.

DESCRIPTION OF THE EMBODIMENTS

Exemplary embodiments will be described below with reference to the accompanying drawings. The following exemplary embodiments do not limit the scope of the appended claims. Not all of the combinations of the features described in the exemplary embodiments are indispensable to the solution of the present disclosure.

General cloud print services allow setting of share ranges of logical printers. Generally, in a case where a user changes a share setting of a logical printer managed by a cloud print service, the user such as an administrator logs in to the cloud print service by using a cloud account. Subsequently, the user needs to move from a menu screen of the cloud service to a printer management page, and then change the share setting of the logical printer. There is a case where a number of printers having a similar model name have been introduced in corporations and other organizations. In such a case, it is hard for the administrator to understand the correspondence relationship between a logical printer name and an actual printer, so that the administrator may falsely recognize the correspondence relationship and set a share range to an unintended printer.

The following exemplary embodiments will be described below centering on a mechanism for improving the convenience in setting of the share range. More specifically, a mechanism for setting the share range of a logical printer on the cloud print service via a screen offered by a printing apparatus registered with the cloud print service.

First Exemplary Embodiment

Figure 1:
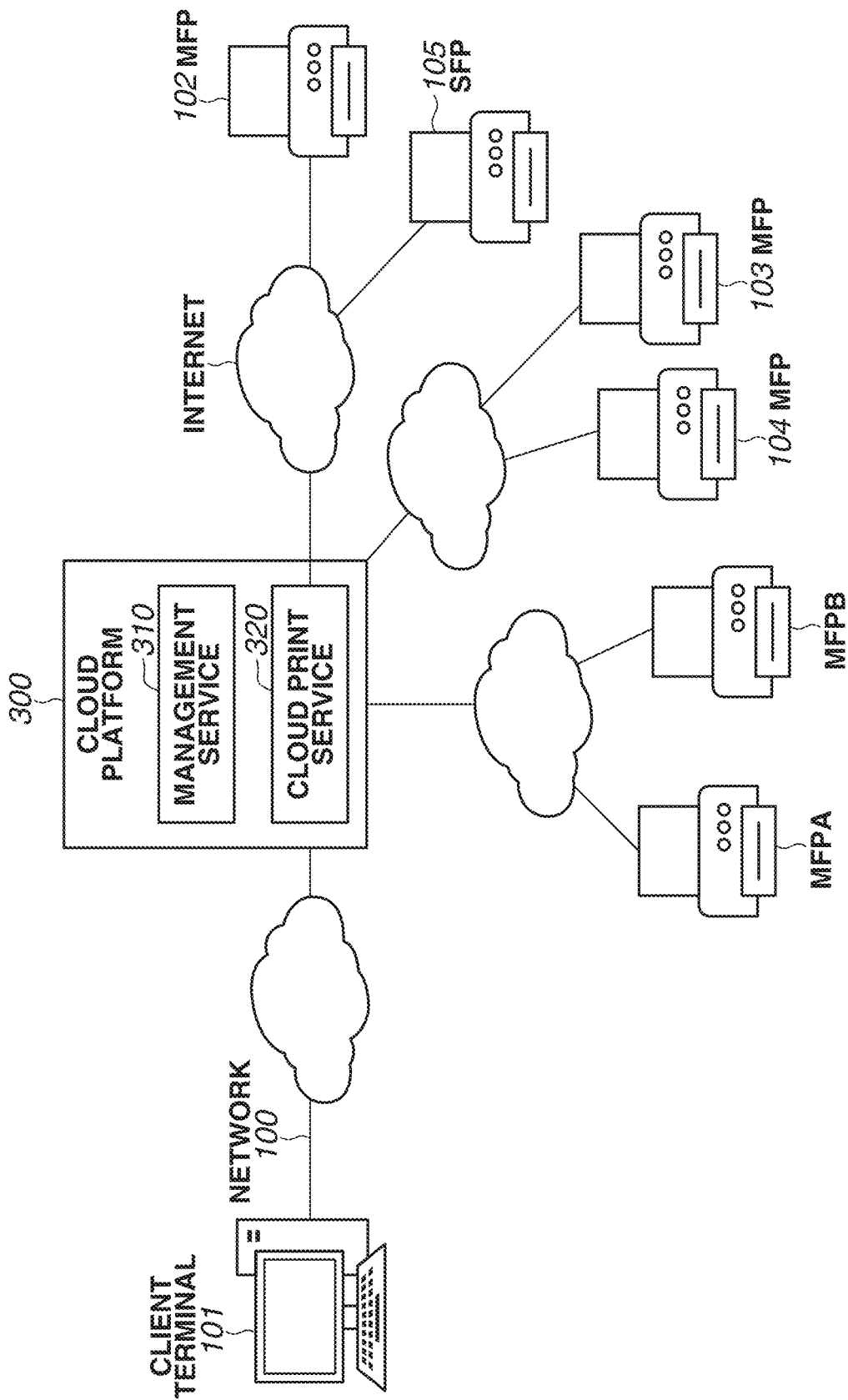
FIG. 1 illustrates an example of a printing system.

A configuration of a printing system according to the present exemplary embodiment will be described below with reference to FIG. 1. The printing system according to the first exemplary embodiment includes a client terminal 101, multifunction peripherals (MFPs) 102 to 104, a single function peripheral (SFP) 105, an MFP A, an MFP B, and a cloud platform 300.

The MFPs 102 to 104, the MFP A, and the MFP B are provided with a scan function of reading a document by using a scanner and then transmitting data based on the obtained image, a print function of printing an image on a sheet such as paper based on a print job received from an external apparatus, and a coy function. Each MFP can receive a print job via a cloud print service 320 (hereinafter also referred to as a CPS 320) offered by the cloud platform 300 and then perform printing based on the print job. The SFP 105 is a single function apparatus having a print function. The SFP 105 also receives a print job via the CPS 320 and then performs printing based on the print job. The MFPs 102 to 104, the MFP A, the MFP B, and the SFP 105 are examples of printing apparatuses.

Although the present exemplary embodiment has been described using an example of a printing apparatus that performs printing on a sheet such as paper, this is not seen to be limiting. For example, the present disclosure is applicable to control of a share range of a three-dimensional (3D) printer apparatus for molding a three-dimensional object based on three-dimensional shape data, a network scanner, a network camera, and other diverse devices shared by a plurality of users.

Referring to FIG. 1 again, the cloud platform 300 offers a management service 310 and the above-described CPS 320. The management service 310 is a service for offering a function of managing user resources and device resources using the cloud platform. The CPS 320 is a cloud print service offered to users using the cloud platform. The CPS 320 receives a print job from the client terminal 101 and, based on a request from a printing apparatus, transmits the received print job to the printing apparatus for printing.

These apparatuses are connected via a network 100 in a communicable manner. The network 100 may be configured as a combination of communication networks such as a local area network (LAN) and a wide area network (WAN), a public wireless communication network (such as Long Term Evolution (LTE) and 5th Generation (5G)), and a wireless network conforming to Institute of Electrical and Electronics Engineer (IEEE) 802.11. In other words, as long as the network 100 can perform data transmission and reception, any communication method for the physical layer may be employed.

<Hardware Configuration of MFP>

A hardware configuration of the MFP 102 will be described below with reference to FIG. 2. The MFPs 103 and 104, the MFP A, and the MFP B have a similar hardware configuration to that of the MFP 102.

Figure 2:
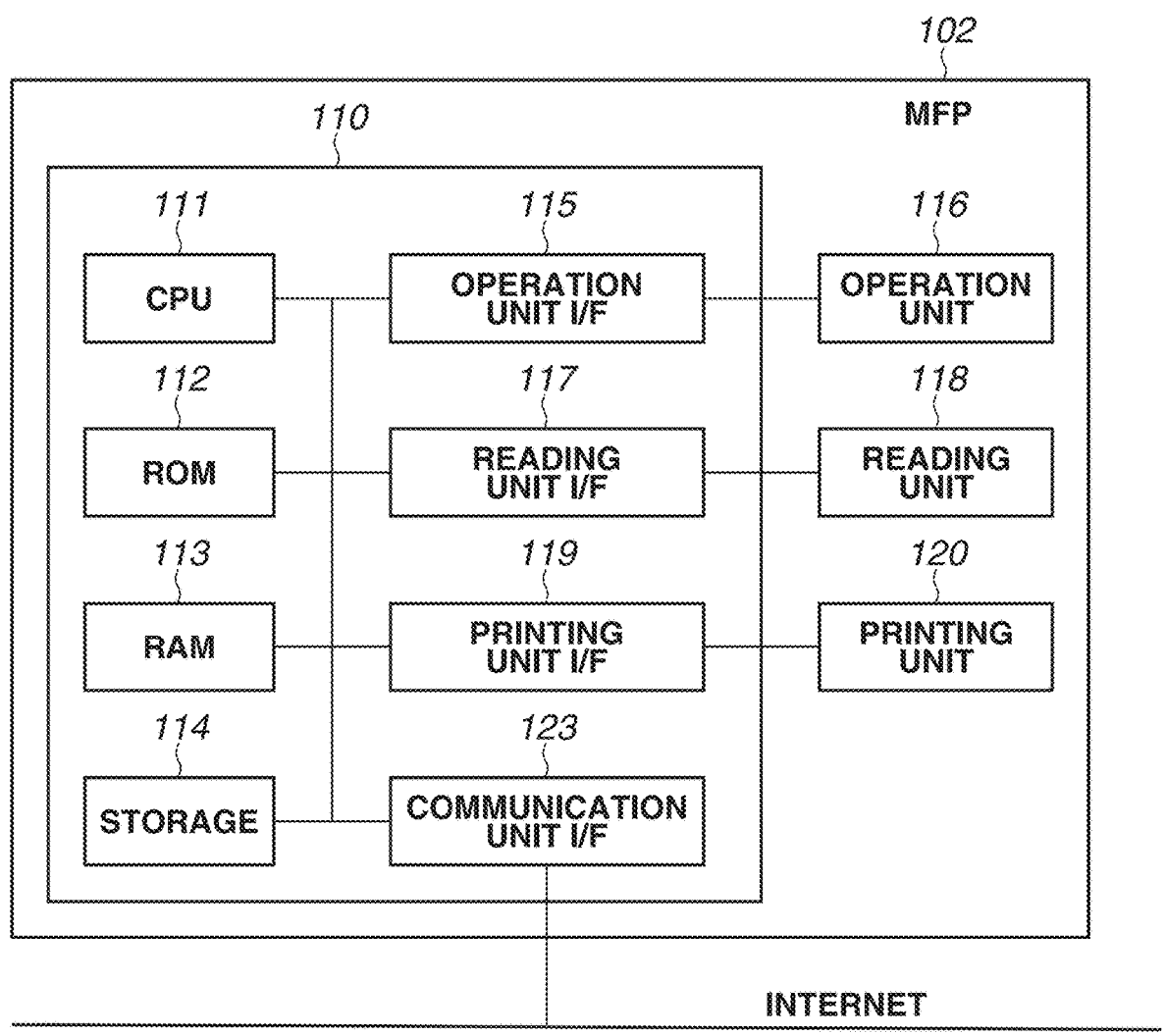
FIG. 2 illustrates an example of a hardware configuration of a multifunction peripheral (MFP).

FIG. 2 is a block diagram illustrating the hardware configuration of the MFP 102. The MFP 102 has a reading function of reading an image on a sheet, and a print function of printing an image on a sheet. The MFP 102 also has a file transmission function of transmitting an image to an external communication apparatus.

A control unit 110 including a central processing unit (CPU) 111 controls operations of the entire MFP 102. The CPU 111 reads a control program stored in a read only memory (ROM) 112 or a storage 114 and performs print control, reading control, and other various control operations. The ROM 112 stores a control program that can be executed by the CPU 111. A random access memory (RAM) 113 serves as the main memory of the CPU 111 and is used as a work area or a temporary storage area for loading various control programs. The storage 114 stores print data, image data, various programs, and various setting information. Although, in the present exemplary embodiment, an auxiliary storage device such as a hard disk drive is assumed as the storage 114, a nonvolatile memory such as a solid state drive (SSD) may be used instead of an HDD. Hardware components including the CPU 111, the ROM 112, and the RAM 113 form a computer.

Although, in the MFP 102 according to the present exemplary embodiment, one CPU 111 executes each of the processes illustrated in flowcharts (described below) by using one memory (RAM 113), other configurations are also applicable. For example, a plurality of processors, RAMs, ROMs and storages are collaborated to perform each of the processes illustrated in flowcharts (described below). Some of the processes may be performed by using hardware circuitry such as an Application Specific Integrated Circuit (ASIC) and a Field Programmable Gate Array (FPGA).

An operation unit interface (I/F) 115 connects an operation unit 116 and the control unit 110. The operation unit 116 is provided with a liquid crystal display (LCD) unit having a touch panel function and various hardware keys, and functions as a display unit for displaying information and a reception unit for receiving user's instructions.

A reading unit OF 117 connects a reading unit 118 and the control unit 110. The reading unit 118 reads a document to generate a read image. The generated read image is stored in the storage 114 or the RAM 113. The read image generated by the reading unit 118 is transmitted to a communication apparatus, and is used for image printing on a sheet.

A printing unit I/F 119 connects a printing unit 120 and the control unit 110. A print image generated based on a print job received from the client terminal 101 is transmitted from the control unit 110 to the printing unit 120 via the printing unit I/F 119. The printing unit 120 receives a control command and a print image via the control unit 110, and prints an image on a sheet fed from a paper cassette (not illustrated) based on the print image. The printing method of the printing unit 120 may be an electrophotographic method or an inkjet printing method. The thermal transfer method and other printing methods are also applicable.

The control unit 110 is connected to the network 100 such as the Internet via a communication unit I/F 123. The communication unit I/F 123 transmits information to the client terminal 101 and the CPS 320 on the Internet, and receives a print job and information from the client terminal 101 and the CPS 320 on the Internet.

<Overview of Cloud Print>

The overview of the cloud print according to the present exemplary embodiment will be described below. The cloud platform 300 is a service platform for offering the CPS 320, web mail, and document generation and editing services to corporations and other organizations. The cloud platform 300 includes the management service 310 for managing users and devices using various services.

In this example case, a user group belonging to tenant A and a user group belonging to tenant B are managed by the management service 310. The management service 310 manages users and user groups for each tenant. The management service 310 also manages the right to use the cloud service and manages access to customer data for each tenant. Here, a tenant is a usage unit of the cloud platform. More specifically, different tenants are assigned to respective organizations (e.g., corporations) which have made a contract for the use of the cloud service platform.

The relation between a user account and a group of "Tenant A" will be described below. User A and User B are registered as users of an organization. User A belongs to a group "SalesDev", and User B belongs to a group "PlanningDev". Although omitted because of space limitation, other users and groups, such as a group "DevelopmentDev", are also registered.

Users such as Users X and Y are registered as users of the organization in "Tenant B" different from "Tenant A". Users X and Y belong to a group such as "0000".

Users belonging to "Tenant A" can perform printing by using the cloud printer associated with tenant A. In the present exemplary embodiment, a case where four different printers (the MFPs 102 to 104 and the SFP 105) are registered in tenant A has been described as an example. Users belonging to "Tenant B" can perform printing by using the MFP A and the MFP B which are cloud printers associated with tenant B.

In view of a case where one tenant is used for a large-scale organization such as a major corporation and a public government office, a mechanism for limiting the share range allowing sharing of cloud printers even in the same tenant is provided in the present exemplary embodiment. With such a limitation, even in a case where several hundreds to thousands of cloud printers are registered in a corporation, for example, appropriate cloud printers can be displayed by filtering the number of printers to be presented to a user based on information about the group which the user belongs to.

The overview of the limitation will be described below. A user who has logged in to the client terminal 101 issues a printer search instruction via a printer search screen of the client terminal. In this example, the user account of the client terminal 101 is associated with the account of the cloud platform. When the user issues a printer search instruction, the client terminal 101 acquires account information of the user who has issued the printer search instruction, and makes an inquiry to the CPS 320 about whether any printer is shared by the user corresponding to the account information.

Upon reception of the inquiry, the CPS 320 makes an inquiry to the management service 310 about the tenant and group identifier (ID) of the user. The management service 310 notifies the CPS 320 of information for identifying the tenant and information for identifying the group which the user belongs to. The CPS 320 identifies a printer available for the group which the user belongs to from among the printers in the notified tenant. The CPS 320 then notifies the client terminal 101 of information necessary to use the identified printer. The client terminal 101 displays the search result based on the information received from the CPS 320. The shared printers offered by the on-premise print server and local printers found in the search in WSD and mDNS may also be displayed as the search result.

The user can select a desired cloud printer from the search result and perform printing via the CPS 320.

Figure 3:
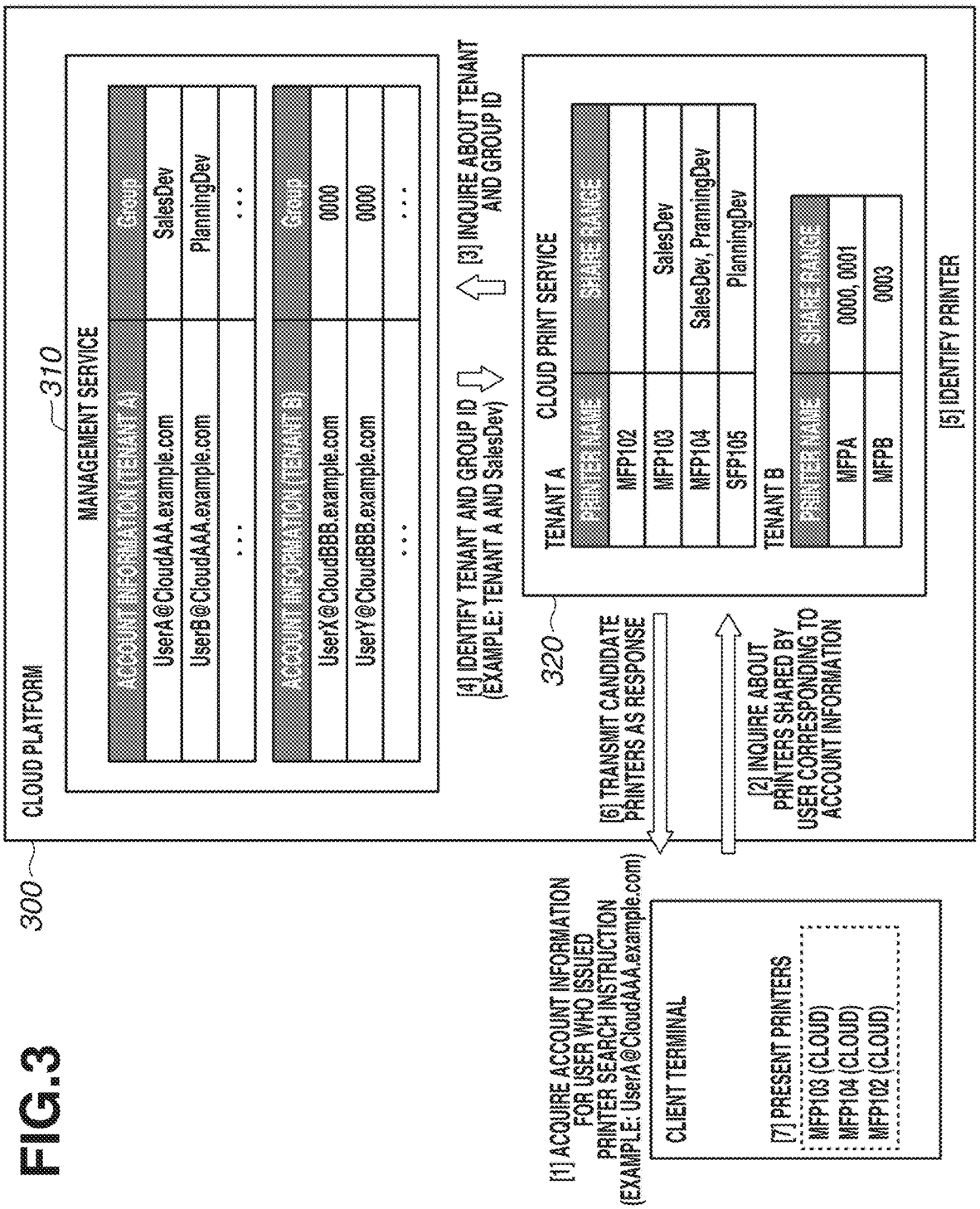
FIG. 3 is a schematic diagram illustrating logical printers registered in a cloud print service (CPS).

For example, when the user having the account "UserA@CloudAAA.example.com" issues a printer search instruction under the condition illustrated in FIG. 3, the following search result is displayed. Firstly, the cloud printers (the MFPs 103 and 104) of which the share range includes "SalesDev" are displayed as a search result. The cloud printer (MFP 102) of which the share range is unset is also displayed as the search result. According to the present exemplary embodiment, a cloud printer of which the share range coincides with that of the group which the user belongs to is preferentially displayed over a cloud printer of which the share range is unset. Such a re-arrangement may be performed by the CPS 320 or on the client terminal 101.

Under these environments, in a case where the share setting for a logical printer managed by the cloud print service is changed, a user such as an administrator opens the web page of the cloud platform 300. Subsequently, the user logs in to the web page of the cloud platform by using the cloud account. The user further needs to move from the menu screen of the cloud service to the printer management page, and then change the share setting for the logical printer. Setting the share range takes time and effort in this way. There is a case where a number of printers having similar model names have been introduced in an organization such as a corporation. In such a case, an administrator may falsely recognize the correspondence relationship between the logical printer name and the actual printer. The administrator accordingly may set the share range to an unintended printer.

In view of at least one of the above-described issues, a mechanism for setting the share ranges of the logical printers on the cloud print service via a screen offered by a printing apparatus registered with the cloud print service is provided according to the present exemplary embodiment. The mechanism will be specifically described below.

<Printer Registration to CPS 320>

Figure 4:
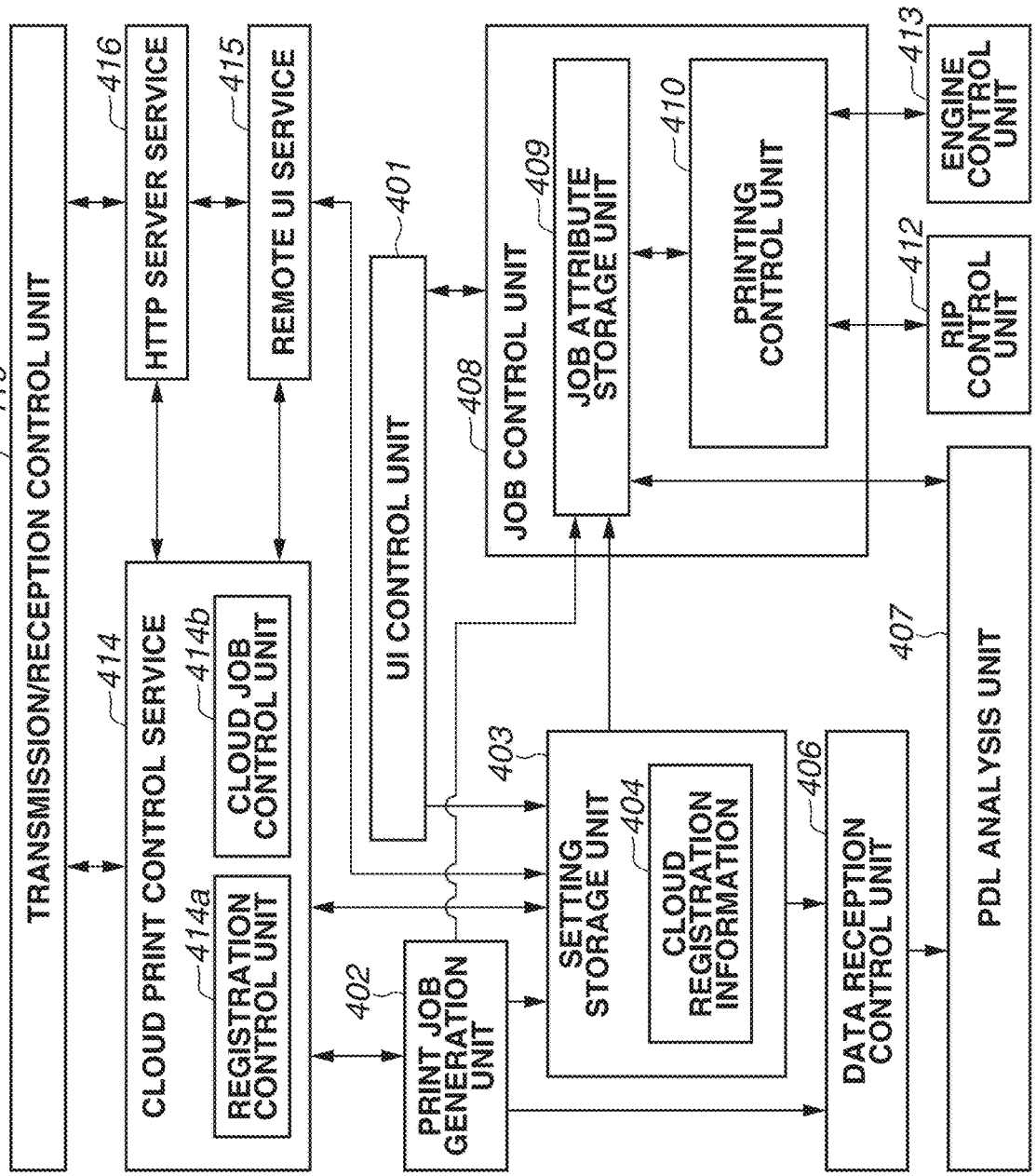
FIG. 4 illustrates an example of a software configuration of the MFP.

Control for registering a printing apparatus such as the MFP 102 with the CPS 320, control for changing the share range, and the software configuration for performing print processing from the cloud printer will be described below. FIG. 4 illustrates an example of a software configuration of the MFP 102.

<Software Configuration of MFP 102>

FIG. 4 illustrates an example of a software configuration of the MFP 102 according to the present exemplary embodiment. The MFP 102 is provided with a remote user interface (UI) service 415 that offers device setting screens (operation screens) of the MFP 102 to an external web browser in collaboration with a Hypertext Transfer Protocol (HTTP) server service 416 providing the HTTP server function. The remote UI service 415 performs display control of device setting screens offered to the outside.

The MFP 102 is also provided with a cloud print control service 414 including a registration control unit 414a for controlling the registration of the MFP 102 with the CPS 320, and a cloud job control unit 414b for controlling a print job received from the CPS 320. The cloud print control service 414 performs communication through HTTP/Hypertext Transfer Protocol Secure (HTTPS) communication via the HTTP server service 416 or via a transmission/reception control unit 419. The cloud print control service 414 may perform all communications (transmissions and receptions) through HTTP/HTTPS communication via the HTTP server service 416.

The cloud print control service 414 and the HTTP server service 416 exchange data with the outside via the transmission/reception control unit 419 and the communication unit I/F 123.

The HTTP server service 416 receives the HTTP request, assigns the request to the web service specified by the request, and instructs the web service to provide a service through HTTP communication. The HTTP server service 416 determines the web service to which the request is to be assigned based on the port number and the Uniform Resource Locater (URL) included in the request.

The remote UI service 415 is a web service offering the remote user interface function for performing the device setting and management of the MFP 102 via the external web browser. The user such as the administrator can confirm and change various device settings of the MFP 102 on the display of a personal computer (PC) by using the remote UI service 415 from the web browser of the client terminal 101.

According to the present exemplary embodiment, the user can perform at least processing for registering the MFP 102 with the CPS 320 and processing for changing the share range setting for the printers on the CPS 320, by accessing the remote UI service 415 from the web browser.

A setting storage unit 403 stores cloud registration information 404 including registration information about the registration with the CPS 320, setting information related to the CPS 320, and the access token for accessing the cloud platform. The cloud registration information 404 is referred to and changed via the registration control unit 414a and the remote UI service 415.

A UI control unit 401 controls the screen to be displayed on the operation unit 116. For example, the UI control unit 401 acquires information about the state of the currently processed print job from the job control unit 408, and displays the print job processing status on the operation unit 116. The user can perform printer registration with the CPS 320 and change the share range via the UI control unit 401.

A print job generation unit 402 collaborates with the job control unit 414b of the cloud print control service 414 to register a new job in the job control unit 408 based on print data of a received cloud print job. The print job generation unit 402 requests the job control unit 408 to start print processing and, at the same time, transmits the received print data to a data reception control unit 406.

When a print job is generated by the print job generation unit 402, the attributes of the print job are stored in a job attribute storage unit 409.

The data reception control unit 406 is a buffer area for the print data received by the print job generation unit 402, and temporarily stores the received data for each print job in the storage 114. Upon completion of the preparation for executing a specific print job, the job control unit 408 instructs a Page Description Language (PDL) analysis unit 407 to subject the specific print job to PDL analysis processing. The PDL analysis unit 407 requests the data reception control unit 406 for print data corresponding to the specific print job. The data reception control unit 406 transmits the print data corresponding to the specific print job to the PDL analysis unit 407.

The PDL analysis unit 407 generates intermediate data based on attribute information (e.g., the number of copies, Nup, color mode, and post-processing settings) of the specific print job stored in the job attribute storage unit 409 and the print data corresponding to the specific print job. The generated intermediate data is transmitted to a raster image processor (RIP) control unit 412. The RIP control unit 412 then converts the intermediate data into a raster image. A printing control unit 410 acquires the raster image generated by the RIP control unit 412 and transmits respective print images separated by cyan, magenta, yellow, and black (CMYK) to an engine control unit 413. The engine control unit 413 collaborates with the printing unit 120 to form an image on a sheet based on the CMYK print images and output a print product. Although the present exemplary embodiment has been described above based on an example case where the PDL analysis unit 407, the RIP control unit 412, and the engine control unit 413 are implemented as software modules, this is not seen to be limiting. The above-described processing may also be implemented by using hardware circuitry such as an ASIC.

<Printer Registration to CPS 320>

Figure 5:
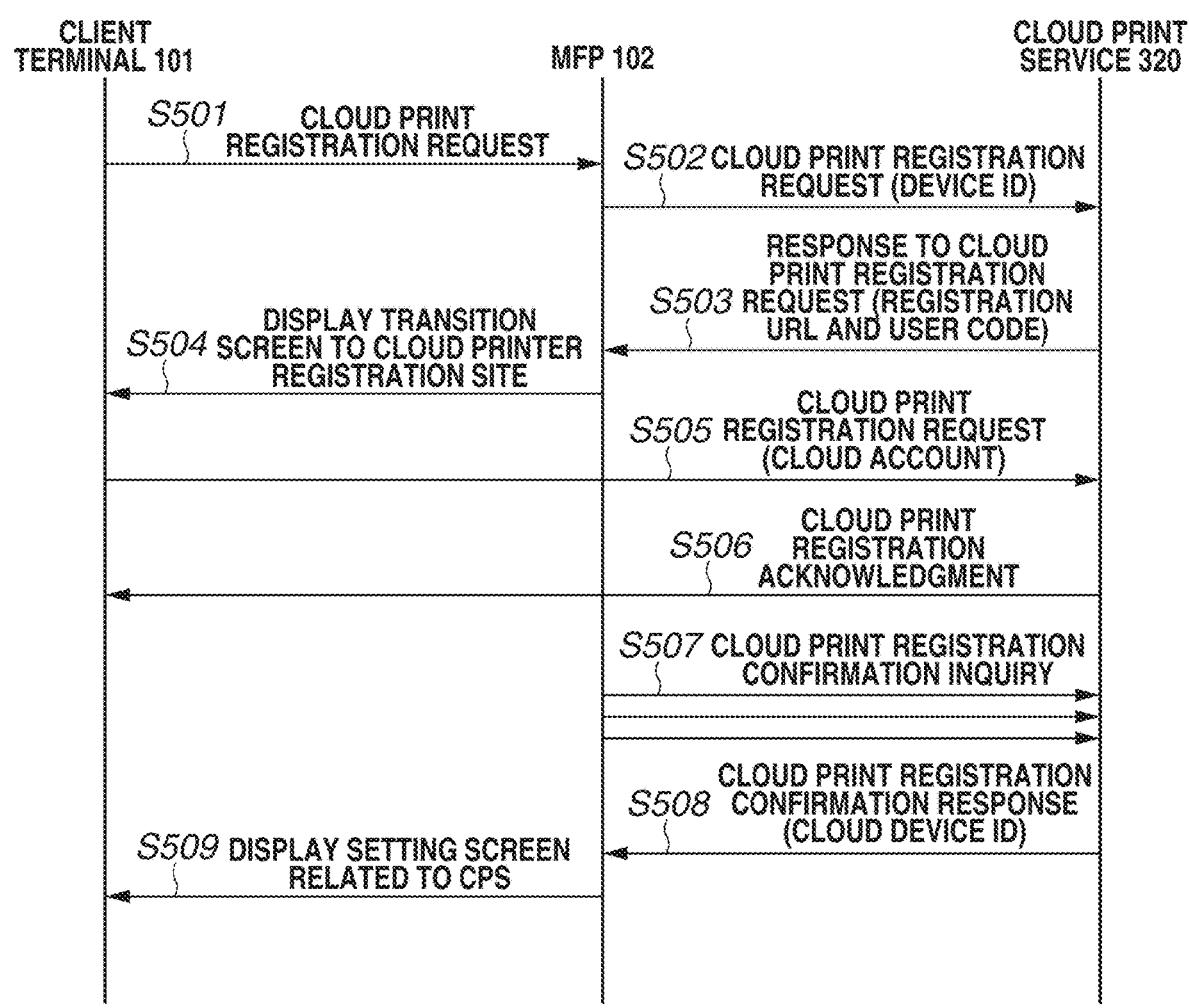
FIG. 5 is a sequence diagram illustrating an example of processing for registering the MFP to the CPS.
Figure 6:
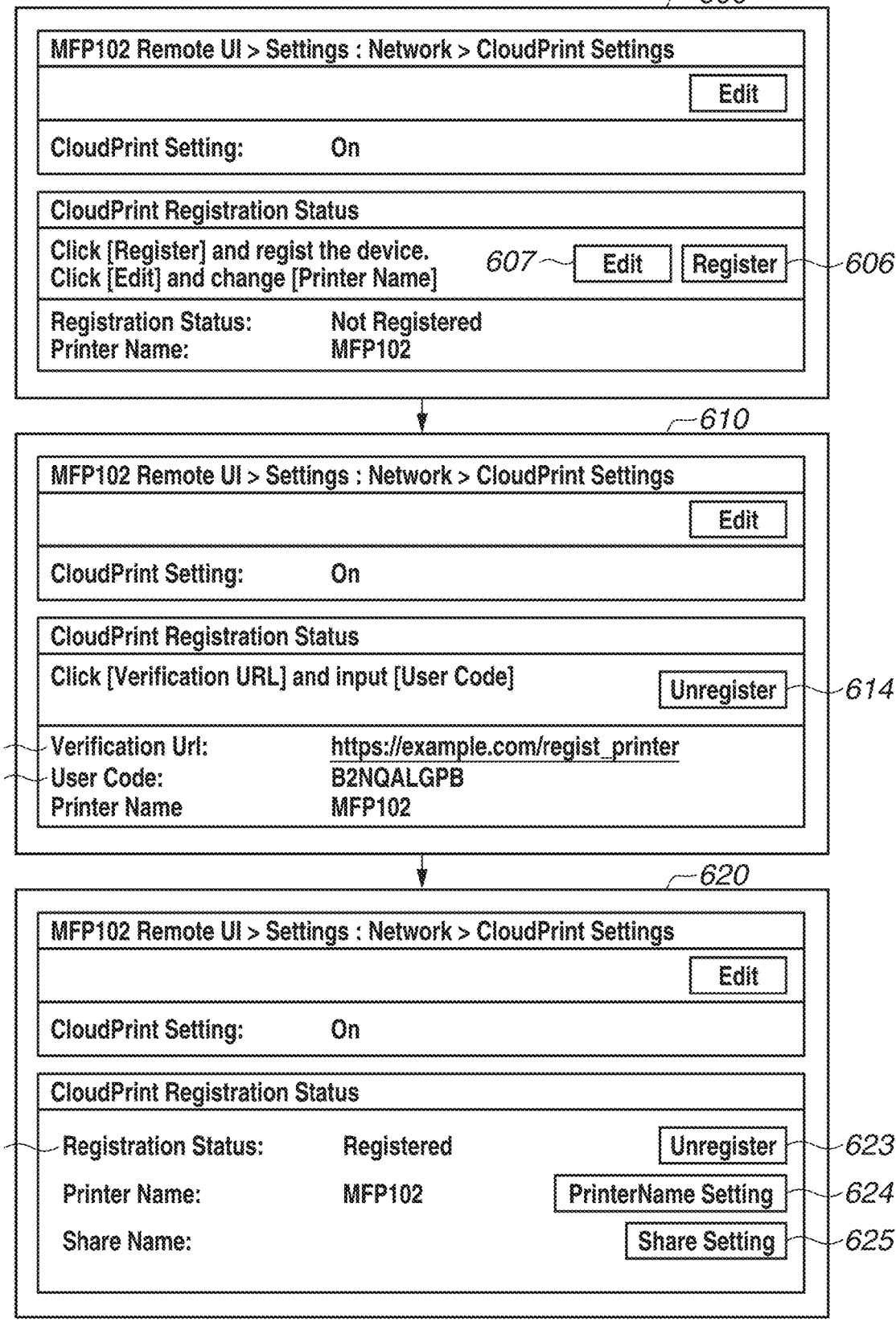
FIG. 6 illustrates examples of setting screens offered to the user by the MFP.

Processing for registering a printer with the CPS 320 will be described below with reference to FIGS. 5 and 6. FIG. 5 is a sequence diagram illustrating an example of registration processing. FIG. 6 illustrates examples of operation screens offered by the MFP 102. The present exemplary embodiment will be described below using an example case where a registration operation is performed via an external web browser. This example is not seen to be limiting. For example, the registration processing can also be performed via a setting screen displayed on the operation unit 116 of the MFP 102.

Firstly, the user such as the administrator accesses the screen of the remote UI service 415 of the MFP 102 by using the web browser on the client terminal 101. Subsequently, the user performs a user operation for changing to the setting screen related with the CPS 320. When the web browser detects the user operation for changing to the setting screen related with the CPS 320, the web browser requests the MFP 102 for setting screen information (drawing data such as HTML). FIG. 6 illustrates examples of screens offered from the MFP 102 to a web browser of an external apparatus, i.e., setting screens related to the CPS 320. Upon reception of a request for a setting screen, the MFP 102 generates information indicating a screen 600 and notifies the web browser of the external apparatus of the information.

The screen 600 is a setting screen for setting and registering the cloud print. By using this screen, the user can make a setting to enable or disable the cloud print via the CPS 320. The user can change settings regarding whether to enable or disable the use of the CPS 320, by using the Edit key. The screen 600 indicates a state where, although the use of the CPS 320 is enabled, pre-registration processing for using a printer from the CPS 320 has not been performed. When the cloud print is not registered, "Not Registered" is displayed. On the other hand, when the cloud print is registered, "Registered" is displayed.

"Printer Name" indicates the printer name for the cloud print. When an Edit key 607 is pressed, a screen for renaming the printer is displayed, enabling the user to rename the printer. A Register key 606 is used to start processing for registering the MFP 102 to the CPS 320.

When the web browser detects that the Register key 606 is pressed by the user, the web browser notifies the printing apparatus of information indicating that the Register key 606 is pressed. In step S501, upon reception of the information, the remote UI service 415 of the MFP 102 determines that a cloud print registration request is received.

Upon reception of the cloud print registration request, the remote UI service 415 requests the registration control unit 414a to perform printer registration with the CPS 320. In step S502, the registration control unit 414a transmits the cloud print registration request to the CPS 320. This request includes identification information (universally unique identifier (UUID)) for uniquely identifying the MFP 102 and the name of a logical printer.

In step S503, upon reception of the cloud print registration request, the CPS 320 transmits a response including a registration URL and a user code as a one-time key used for registration to the MFP 102.

Upon reception of the response, the registration control unit 414a transmits the response to the remote UI service 415. In step S504, the remote UI service 415 generates information indicating a transition screen for transitioning to the cloud printer registration site based on the response, and transmits the information indicating the generated transition screen as a response to the request issued in step S501. Based on the information indicating the transition screen, the web browser of the client terminal 101 displays the transition screen on the display.

A screen 610 illustrated in FIG. 6 is an example of the transition screen. The screen 610 displays a link 612 for opening the registration URL in a different tab or window, and a user code 613 as a one-time password.

The user can open the registration page of the CPS 320 by selecting the link 612. The user can also stop the registration by using an Unregister key 614. Upon detection of the depression of the Unregister key 614, the MFP 102 stops the registration processing.

Upon detection of the operation for selecting the link 612, the web browser requests the CPS 320 for the registration page of the CPS 320, and displays the screen of the registration page based on the information obtained as a response to the request. In the registration page (not illustrated), the user code is input. Upon input of the user code, user authentication processing for associating the printer with a tenant is performed. When information about the tenant administrator of the cloud platform 300 is input via an authentication reception screen (not illustrated) and the authentication is successful, then in step S505, the web browser of the client terminal 101 transmits a cloud print registration request to the CPS 320. The request includes the cloud account of the cloud platform. When the CPS 320 determines that the cloud print registration request is valid, then in step S506, the CPS 320 responds to the web browser of the client terminal 101 with a cloud print registration acknowledgment. In a case where the user code is wrong and the user code is disabled after a passage of a certain time period, or in a case where the authentication is performed based on an account not having the cloud printer registration right, the CPS 320 determines that the cloud print registration request is invalid and transmits a response for rejecting the registration.

In response to the request, the CPS 320 registers the MFP 102 as a cloud printer (logical printer) available from the tenant which the user of the account received in step S505 belongs to.

In step S507, the registration control unit 414a makes an inquiry about whether the registration with the CPS 320 is completed at predetermined intervals. Upon completion of the generation of the logical printer corresponding to the MFP 102, then in step S508, the CPS 320 transmits a response to the inquiry made in step S507. This response includes the cloud device ID used to uniquely identify a logical printer on the CPS 320, various services on the CPS 320 and the cloud platform 300, and the access token issued by the CPS 320 to access the resources. The registration control unit 414a stores the cloud device ID, the access token, and the registration status as the cloud registration information 404 of the setting storage unit 403. The access token is authorization information indicating the right to access the resources on a specific tenant on the cloud platform 300.

Subsequently, the registration control unit 414a notifies the remote UI service 415 of the completion of the registration. Upon reception of the registration completion notification, then in step S509, the remote UI service 415 generates information indicating a setting screen related to the CPS 320 based on the cloud registration information 404 of the setting storage unit 403 and then transmits the information to the web browser of the client terminal 101. Upon reception of the information, the web browser of the client terminal 101 changes the screen on the display based on the information received in step S509. A screen 620 illustrated in FIG. 6 is an example of a setting screen that displays a registration status 622 on the CPS 320.

The registration state of the cloud print is displayed on the setting screen 620. In this example case, the registration has been successfully completed. An Unregister key 623 is used to cancel the logical printer registration to the CPS 320. A PrinterName Setting key 624 is used to rename the logical printer corresponding to the NFP 102 managed by the CPS 320. Upon reception of an operation for renaming the logical printer via a change screen (not illustrated) displayed after the depression of the PrinterName Setting key 624, the remote UI service 415 notifies the registration control unit 414a of the name after the change. The registration control unit 414a transmits the access token and a renaming request including the cloud device ID to the CPS 320. This processing enables the user to rename the logical printer on the CPS 320 only through an operation on a screen offered by the MFP 102.

A Share Setting key 625 is used to set the share range of the MFP 102 on the CPS 320. Control to be performed when the Share Setting key 625 is pressed will be described below.

<Setting Share Range via Management Screen of CPS 320>

In the above-described processing, the user can register a printing apparatus such as the MFP 102 on the CPS 320. Control for changing the share range of the logical printer managed by the CPS 320 via the management screen of the CPS 320 will be described below with reference to FIG. 7.

Figure 7:
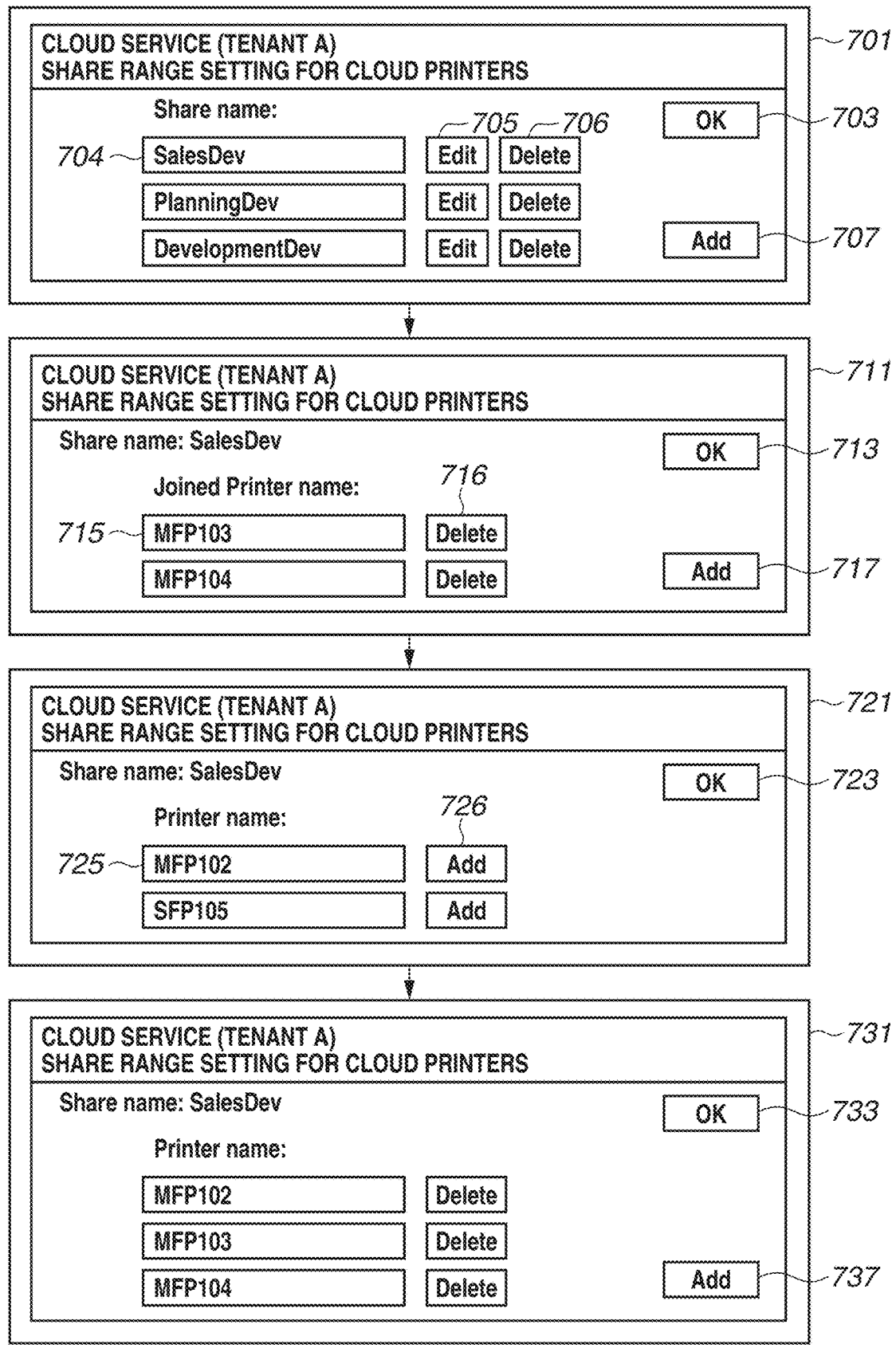
FIG. 7 is examples of printer management screens offered to the user by the CPS.

FIG. 7 illustrates examples of screens offered to the user such as the administrator by the CPS 320. The user such as the administrator accesses a portal screen of the cloud platform 300. When authentication information is input via the portal screen and then the authentication by the CPS 320 is successful, a menu screen is displayed. Subsequently, the user performs an operation for changing the display from the menu screen to the printer management page of the CPS 320. The web browser of the client terminal 101 displays a management screen of the CPS 320 based on the information indicating a screen received from the CPS 320. A screen 701 illustrated in FIG. 7 is an example of the management screen.

The screen 701 is a management screen for setting the share ranges of the logical printers registered with the CPS 320. An area 704 displays share names already registered on the CPS 320. A share name refers to identification information for identifying the share range. In this example case, the administrator of tenant A logs in to the CPS 320 via the web browser, and the management screen of the CPS 320 is displayed. Accordingly, "SalesDev", "PlanningDev", and "DevelopmentDev" are displayed as registered share names.

In the present exemplary embodiment, the share names managed by the CPS 320 are configured to be associated with the group names managed by the management service 310 illustrated in FIG. 3. However, the configuration is not limited thereto. Attributes for filtering user ranges other than the group names (attributes such as information about the location of the user's work place, the user's role, and the employment status of the user) may be associated with the share name. In this case, the administrator can preset to the CPS 320 the attributes to be used for narrowing down the user and limit the share range according to the attributes. The share name may be generated on the CPS 320 in advance, and the correspondence relation of the attributes for narrowing down the share name and share range may be configured on the management service 310.

A Delete key 706 is used to delete the share name, and an OK key 703 is used to apply setting changes. An Add key 707 is used to add a share name. When an operation for adding or deleting a share name is performed, the group attributes of the management service 310 are also updated in association with the operation.

An Edit key 705 is used to edit the printer belonging to the share name. When the CPS 320 detects the selection of the Edit key 705, the CPS 320 displays a screen 711 on the web browser of the client terminal 101.

The screen 711 is a screen for editing printers belonging to a specified share name. The screen 711 illustrates an example of a screen where "SalesDev" is specified as a share name. An area 715 displays the printers that have already been set. According to the present exemplary embodiment, "MFP 103" and "MFP 102" are displayed as set printers. Upon detection of the depression of the Delete key 716, the CPS 320 deletes the selected printer from the printer group having the share name of "SalesDev". Upon detection of the depression of an OK key 713, the CPS 320 reflects the setting changes and then changes the screen on the web browser to the screen 701. An Add key 717 is used to add a printer to be shared to a user group identified based on the share name. Upon detection of the depression of the Add key 717, the CPS 320 changes the screen displayed on the web browser to a screen 721. The screen 721 is used to change the share range based on the share name. An area 725 displays a list of the logical printers already registered with the CPS 320. These printers belong to the tenant which the user changing the settings belongs to but have not been associated with the share name. In this case, the area 725 displays the SFP 105 of which the share range is limited to "PlanningDev", and the MFP 102 of which the share range is not limited.

An OK key 723 is used to reflect the settings. Upon detection of the depression of the OK key 723, the CPS 320 changes the screen displayed on the web browser to the screen 711. Upon detection of the depression of an Add key 726, the CPS 320 associates the printer (MFP 102) corresponding to the Add key 726 with the share name (SalesDev). When the association is performed through the operation of the Add key 726, the CPS 320 changes the display to allow the user to recognize that the logical printer for which the association is completed has been added. For example, the logical printer is displayed in gray or deleted from the area 725.

Upon detection of the depression of the OK key 723, the CPS 320 changes the screen displayed on the web browser to a screen 731. This example screen is displayed after "MFP 102" has been added through the screen 721. An Add key 737 is used to perform a similar operation to that with the Add key 717, and the redundant description thereof will be omitted.

The above-described processing allows the user to change the share ranges of the logical printers on the CPS 320. According to the present exemplary embodiment, the share name is set as a starting point in changing the share range setting, and the printers to be associated with the share name are edited. This enables the user to set the share range in a more comprehensible way than the general method for setting the share range, in which a logical printer is selected and then a share range is set. This makes it possible to improve the convenience in setting the share range of a printing apparatus in the cloud print service.

<Print Processing>

Figure 8:
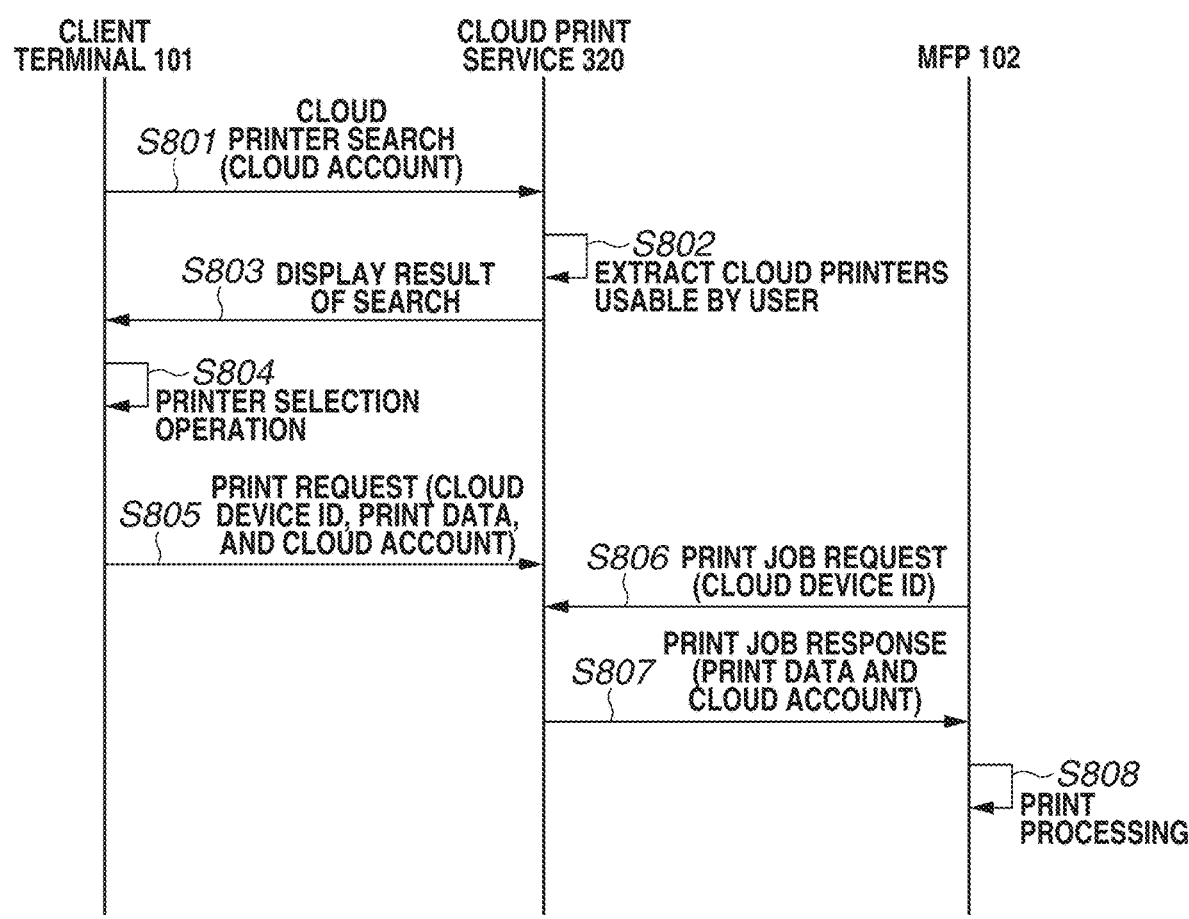
FIG. 8 is a sequence diagram illustrating an example of print processing using the CPS.

Print processing using the CPS 320 will be described below. FIG. 8 is a sequence diagram illustrating an example of print processing using the CPS 320.

In steps S801, the client terminal 101 issues a printer search instruction. In step S802, the CPS 320 collaborates with the management service 310 to extract printers available for the user. In step S803, the CPS 320 transmits the result of the search (extraction) in the processing in step S802 to the client terminal 101. In step S804, the user selects a logical printer that the user desires to use based on the search result. Details of these processes are similar to the processes described with reference to FIG. 3 and the redundant description thereof will be omitted. The following descriptions will be given based on an assumption that the logical printer on the CPS 320 corresponding to the NFP 102 is selected.

Subsequently, the user of the client terminal 101 changes the print settings as necessary, and inputs a print start instruction via the operation unit of the client terminal 101. Upon detection of the print start instruction, then in step S805, the client terminal 101 generates a print job including print data and print settings based on drawing data to be printed, and transmits the print job to the CPS 320. The print job includes the cloud device ID for identifying a logical printer and the cloud account ID of the user using the client terminal 101.

Upon reception of the print job transmitted in step S805, the CPS 320 stores the print job in a storage. The CPS 320 performs access control so that the stored print job can be used only by a user belonging to the tenant which the user who has transmitted the print job belongs to, and a device belonging to the tenant. In other words, the CPS 320 performs control so that a print job transmitted by User A of tenant A cannot be accessed by a user belonging to tenant B or a device of tenant B.

In step S806, the NFP 102 transmits a print job acquisition request including the cloud device ID and the access token to the CPS 320. The cloud device ID may be included in the access token.

Although, in the present exemplary embodiment, control is performed such that the MFP 102 repeats an inquiry at predetermined polling intervals, the exemplary embodiment is not limited thereto. For example, when the user logs in to the MFP 102, the MFP 102 may make an inquiry about whether a print job of the user exists.

Upon reception of the job acquisition request, the CPS 320 identifies a logical printer managed on the cloud based on the cloud device ID. In step S807, the CPS 320 extracts a print job that has been transmitted to the logical printer and then stored in the storage and then transmits the extracted print job to the MFP 102. In a case where there is no print job, the CPS 320 transmits a response indicating that there is no print job in waiting for printing to the MFP 102.

When the MFP 102 receives the print job from the CPS 320, the received print job is then transmitted to the job control unit 414b. The job control unit 414b collaborates with the print job generation unit 402 to interpret the command and settings of the received print job in the format of the CPS 320 and generate a new job by suitably converting the print job into a print job format supported by the MFP 102. The generation unit 402 requests the job control unit 408 to register the new job and then start the print processing. Accordingly, the above-described control units related to print processing collaborate with each other to generate a print image based on the received print job. The generated print image is printed by the printing unit 120. In step S808, when printing based on the print job is completed, a series of printing processing is completed.

<Changing Share Range via Screen Offered by MFP>

Figure 9:
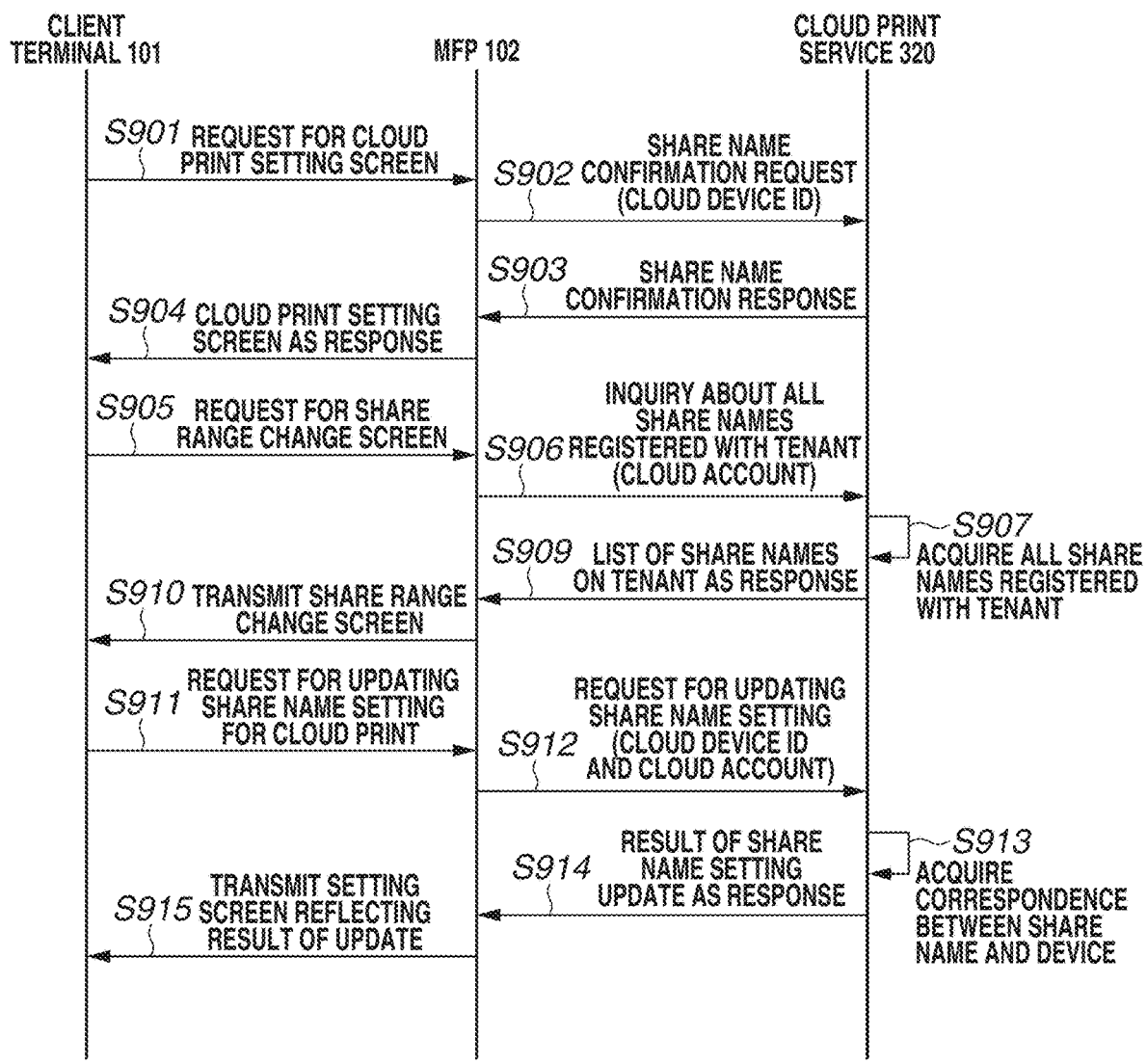
FIG. 9 is a sequence diagram illustrating an example of processing for changing a share setting on the CPS by using the MFP.

A method for changing the settings of the logical printer corresponding to the MFP 102 via screens offered by the MFP 102 will be described below with reference to FIGS. 9 and 10. FIG. 9 is a sequence diagram illustrating an example of processing for setting the share range of the logical printer via screens offered by the MFP 102. FIG. 10 illustrates examples of the screens offered by the MFP 102. Although web UIs are illustrated in these examples, the screens are not limited thereto. The share range can also be set via the operation unit 116. In this example case, the logical printer corresponding to the MFP 102 is registered in association with "Tenant A" of the CPS 320.

The user such as the administrator accesses the remote UI service 415 of the MFP 102 by using the web browser of the client terminal 101 and then performs an operation for calling the cloud print setting screen 600 on the MFP 102. Upon detection of the operation, then in step S901, the web browser requests the remote UI service 415 of the MFP 102 for the cloud print setting screen 600. Upon reception of the request for the setting screen, the remote UI service 415 requests the registration control unit 414a to acquire the share name. Upon reception of the request, then in step S902, the registration control unit 414a transmits, to the CPS 320, a request for confirming the share name set to the MFP 102. This request includes the cloud device ID and the access token stored as the registration information 404.

Upon reception of the confirmation request, the CPS 320 identifies a logical printer based on the cloud device ID and then acquires a list of registered share names stored in association with the logical printer. In step S903, the CPS 320 transmits the acquired list of share names as a response to the request.

Upon reception of the list of share names, the registration control unit 414a notifies the remote UI service 415 of the list of share names. In step S904, the remote UI service 415 generates information indicating a setting screen based on the received list of registered share names and then transmits the generated information indicating the screen to the web browser of the client terminal 101. The web browser of the client terminal 101 changes the screen displayed on the display based on the received information indicating the screen.

A screen 1000 illustrated in FIG. 10 is an example of a setting screen displayed on the client terminal 101. In this example case, the share name to be used for narrowing down the share range of the MFP 102 is unset.

An area 1005 displays the setting status of the cloud print and is used to make setting. Keys 1002 to 1004 are similar to the keys 623 to 625 illustrated in FIG. 6.

Upon detection of the depression of the Share Setting key 1004 on the web browser, then in step S905, the web browser requests the remote UI service 415 of the MFP 102 for the screen for changing the share range of the cloud print.

Upon reception of the request issued in step S905, the remote UI service 415 requests the registration control unit 414a to acquire a list of all share names. Upon reception of the request, then in step S906, the registration control unit 414a transmits a request for making an inquiry about all share names in the tenant to the CPS 320. This request includes the access token and the cloud account. Upon reception of the request issued in step S906, then in steps S907, the CPS 320 collaborates with the management service 310 to identify the tenant of the cloud account and then acquires a list of all share names managed on the tenant. In step S909, the CPS 320 transmits the acquired list of all share names as a response to the MFP 102.

Upon reception of the response issued in step S909, the registration control unit 414a notifies the remote UI service 415 of the list of all share names. The remote UI service 415 generates information indicating the change screen for changing the share range of the logical printer on the CPS 320 corresponding to the MFP 102 based on all share names. In step S910, the remote UI service 415 transmits information indicating the generated change screen to the client terminal 101. The web browser of the client terminal 101 changes the screen displayed on the display based on the received information indicating the change screen.

A screen 1010 illustrated in FIG. 10 is an example of a change screen displayed on the client terminal 101. An area 1013 displays the setting statuses of the share names and is used to make setting. The area 1013 displays display items indicating the share names "SalesDev", "PlanningDev", and "DevelopmentDev" registered with tenant A. The check box displayed to the right of each display item indicates the setting states of the share names.

In this example case, the user makes setting to share the MFP 102 for "SalesDev" and "PlanningDev". The user presses display items indicating "SalesDev" and "PlanningDev" to set share names for narrowing down the share range of the MFP 102. An OK key 1011 is used to apply the setting changes.

Referring to FIG. 9 again, upon reception of the setting changes and then detection of the depression of the OK key 1011, then in step S911, the web browser of the client terminal 101 transmits a request including information indicating the setting changes to the remote UI service 415. Based on the information received in step S911, the remote UI service 415 generates a list of share names to be associated with the MFP 102 and then requests the registration control unit 414a to update the share names. Upon reception of the request, then in step S912, the registration control unit 414a transmits a request for updating the share name to be associated with the logical printer of the MFP 102 to the CPS 320. This request includes the cloud device ID, the cloud account, and the access token.

Upon reception of the request issued in step S912, the CPS 320 identifies a tenant based on the cloud account. The CPS 320 further identifies a logical printer of which the setting is to be changed from among the logical printers registered with the identified tenant by using the cloud device ID. In step S913, the CPS 320 updates the share name to be associated with the identified logical printer based on the list of share names received from the MFP 102.

Upon completion of the update, then in step S914, the CPS 320 transmits the result of changing the share name settings as a response to the registration control unit 414a. Upon reception of the result, the registration control unit 414a notifies the remote UI service 415 of the result. Then, the remote UI service 415 generates information indicating a setting screen to which the update result based on the result is reflected, and transmits the information to the web browser of the client terminal 101. Upon reception of the information indicating the setting screen, then in step S915, the web browser displays a screen based on the information indicating the setting screen on the display.

A screen 1030 illustrated in FIG. 10 is an example of a setting screen, to which the update result is reflected, displayed on the client terminal 101. An area 1031 of the screen 1030 displays "SalesDev" and "PlanningDev" as share ranges newly set in the update. The setting screen 1030 functions as a confirmation screen for confirming the share ranges.

Figure 12:
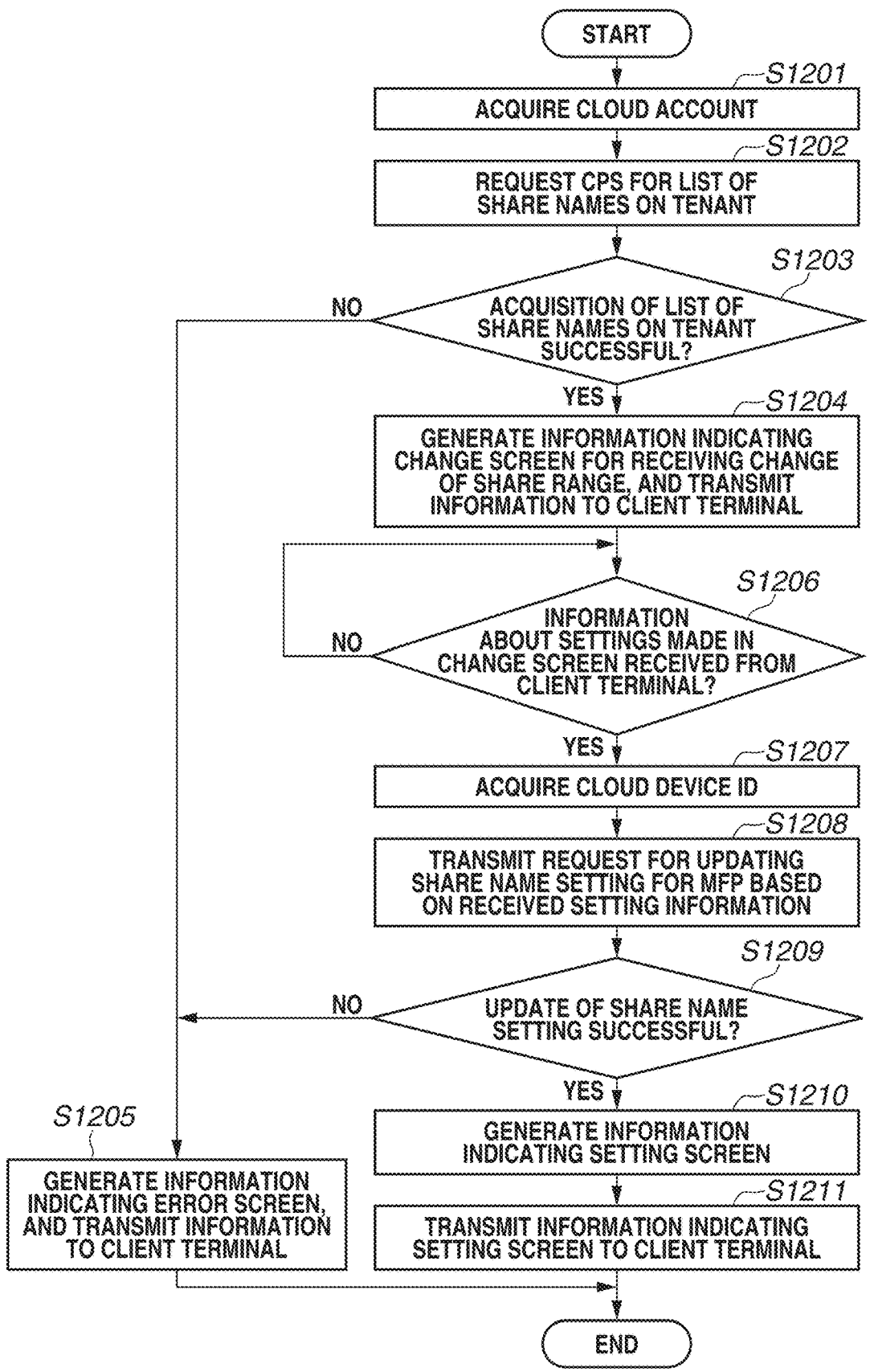
FIG. 12 is another flowchart illustrating an example of control performed by the MFP.

The control performed by the MFP 102 to change the share range described with reference to FIGS. 9 and 10 will be described below with reference to the flowcharts illustrated in FIGS. 11 and 12. Each operation (step) of the flowcharts illustrated in FIGS. 11 and 12 is implemented when the CPU 111 loads a program corresponding to each control module stored in the ROM 112 or the storage 114 into the RAM 113 and then executes the program. According to the present exemplary embodiment, data transmission and reception processing is implemented through the collaboration between the CPU 111 and each of the I/Fs and hardware components.

In a case where a software module embodying processing is to be clarified, the name of the software module causing the CPU 111 to execute the processing is described as the subject instead of the CPU 111.

FIG. 11 illustrates processing of the MFP 102 corresponding to the sequences in steps S901 to S904. Each of the processes illustrated in FIG. 11 is performed when the cloud print setting screen 600 is requested from the client terminal 101.

In step S1101, the remote UI service 415 reads the cloud registration information 404 from the storage unit 403. More specifically, the remote UI service 415 acquires the cloud print setting status, the cloud print registration status, and the printer names. Subsequently, the remote UI service 415 requests the registration control unit 414*a* to acquire the share name corresponding to the MFP 102.

In step S1102, the registration control unit 414*a* acquires the cloud device ID and the access token to be used to access the CPS 320 from the storage unit 403. In step S1103, the registration control unit 414*a* issues a request for acquiring the share name corresponding to the MFP 102 and including the cloud device ID and the access token.

In step S1104, the registration control unit 414*a* waits for a response to the request issued in step S1103. When the acquisition of the share name corresponding to the MFP 102 is successful as a result of response (YES in step S1104), the registration control unit 414*a* notifies the remote UI service 415 of the acquired share name. Then, the processing proceeds to step S1105. On the other hand, when the MFP 102 receives no response or a response indicating an error (NO in step S1104), the registration control unit 414*a* notifies the remote UI service 415 of information indicating the acquisition failure. Then, the processing proceeds to step S1106.

In step S1105, based on the share name notified from the registration control unit 414*a* and the information acquired in step S1101, the remote UI service 415 generates information indicating a setting screen including a display item indicating the current share range.

In step S1106, based on the information acquired in step S1101, the remote UI service 415 generates information indicating a setting screen including an error message. In step S1107, the remote UI service 415 transmits the information indicating the setting screen generated in step S1105 or S1106 to the client terminal 101. The screen 1000 illustrated in FIG. 10 can be displayed through the above-described processing. When the acquisition of the share range fails, a screen 1300 illustrated in FIG. 13 is displayed. An error message is displayed in an area 1301 indicating the share range of the screen 1300.

Processing of the MFP 102 corresponding to the processing in steps S905 to S915 in the sequence diagram of FIG. 9 will be described below with reference to FIG. 12. The processing illustrated in FIG. 12 is performed when the remote UI service 415 receives a request for a change screen transmitted by the web browser of the client terminal 101 upon depression of the Share Setting key 1004.

The remote UI service 415 requests the registration control unit 414*a* to acquire a list of share names on the tenant. Upon reception of the request, then in step S1201, the registration control unit 414*a* acquires the cloud account and the access token from the storage unit 403. In step S1202, the registration control unit 414*a* requests the CPS 320 for a list of share names on the tenant.

In step S1203, the registration control unit 414*a* determines whether the acquisition of the list of share names on the tenant is successful. When the acquisition of the list of share names on the tenant is successful (YES in step S1203), the registration control unit 414*a* notifies the remote UI service 415 of the acquired list of share names on the tenant. Then, the processing proceeds to step S1204. On the other hand, when the CPU 111 receives no response to the request issued in step S1202 or a response indicating an error (NO in step S1203), the registration control unit 414*a* notifies the remote UI service 415 of information indicating the acquisition failure. Then, the processing proceeds to step S1205.

In step S1205, the remote UI service 415 generates information indicating an error screen and transmits the information indicating the error to the client terminal 101. A screen 1310 illustrated in FIG. 13 is an example of a screen displayed in a case where the registration control unit 414*a* determines that the acquisition of the list of share names has failed in step S1203. In this case, an area 1311 displays an error message indicating the acquisition failure.

In step S1204, the remote UI service 415 generates information indicating a change screen for receiving a change of the share range of the logical printer on the CPS 320 corresponding to the MFP 102, and transmits the information to the client terminal 101.

In step S1206, the remote UI service 415 determines whether information about settings made in the displayed change screen is received from the web browser of the client terminal 101. When the setting information is received (YES in step S1206), the remote UI service 415 generates a list of share names to be newly associated with the NFP 102 based on the received setting information. The remote UI service 415 further requests the registration control unit 414*a* to update the share name. Then, the processing proceeds to step S1207. On the other hand, when the setting information is not received (NO in step S1206), the remote UI service 415 waits for reception of the setting information.

In step S1207, the registration control unit 414*a* acquires the cloud device ID from the storage unit 403. Then, the processing proceeds to step S1208. In step S1208, the registration control unit 414*a* transmits a request including the device ID acquired in step S1208, the cloud account acquired in step S1201, the access token, and the list of share names to the CPS 320.

In step S1209, the registration control unit 414*a* determines whether the request issued in step S1208 is successful. When information indicating that the request is successful is received in response to the update request (YES in step S1209), the registration control unit 414*a* notifies the remote UI service 415 of information indicating that the update is successful. Then, the processing proceeds to step S1210. On the other hand, when the CPU 111 receives no response to the request issued in step S1208 or a response indicating an error (NO in step S1209), the registration control unit 414*a* notifies the remote UI service 415 of information indicating the update failure. Then, the processing proceeds to step S1205. If the update fails, a screen 1320 illustrated in FIG. 13 is displayed. An area 1321 of the screen 1320 indicating the share range displays an error message.

In step S1210, the remote UI service 415 generates information indicating a setting screen for displaying a list of share names indicating the share range after the update. In step S1211, the remote UI service 415 transmits the information indicating the setting screen generated in step S1201 to the web browser of the client terminal 101.

The above-described processing makes it possible to change the settings of a logical printer on the CPS 320 via a screen offered by the MFP 102.

Second Exemplary Embodiment

A second exemplary embodiment will be described below centering on a mechanism for promoting share range setting in association with the registration processing according to the first exemplary embodiment described with reference to FIG. 7. The system configuration, the hardware configuration, and the software configuration are similar to those according to the first exemplary embodiment.

Figure 14:
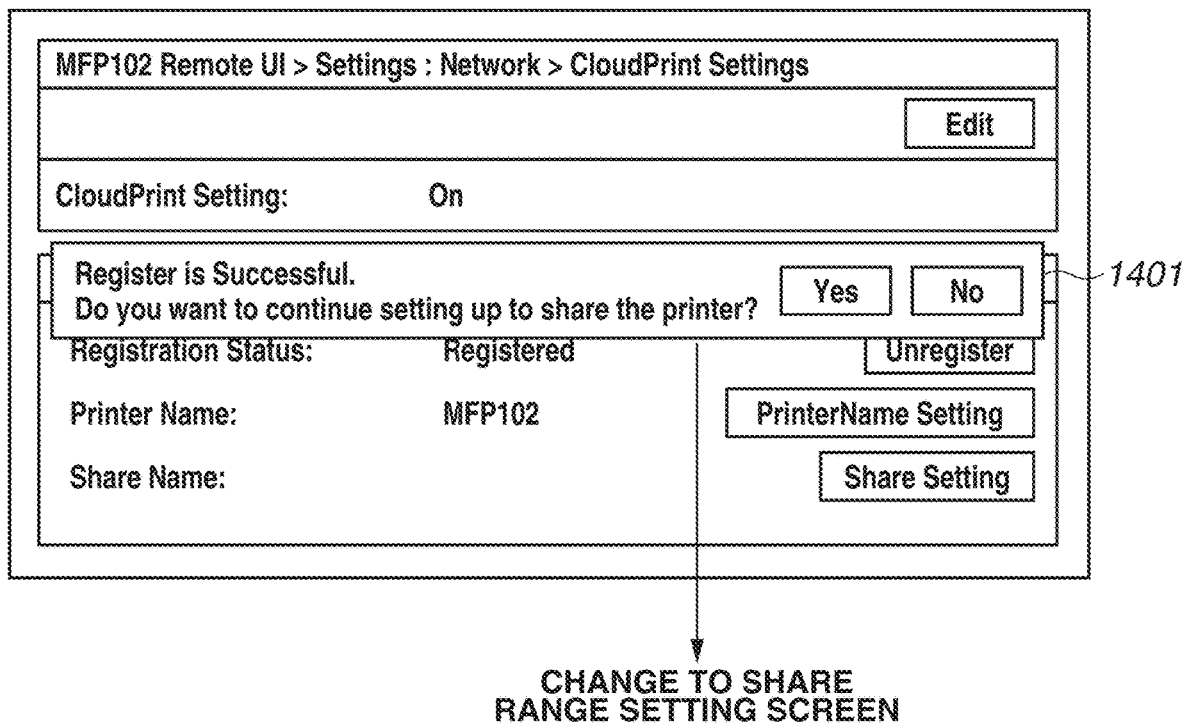
FIG. 14 illustrates an example of a screen offered to the user by the MFP according to a second exemplary embodiment.

FIG. 14 illustrates an example of a screen offered to the user by the MFP 102 according to the second exemplary embodiment, and is an example of a setting screen displayed instead of the screen 620 illustrated in FIG. 6 according to the first exemplary embodiment.

In the screen illustrated in FIG. 14, a pop-up message 1401 is displayed as a display object for notifying the user that the registration is successful and that the share range can be accordingly set.

By pressing the "Yes" key in the pop-up message 1401, a share range setting screen can be displayed. Upon reception of information indicating the depression of the "Yes" key from the web browser of the client terminal 101, the remote UI service 415 performs similar screen transition control to the screen transition control performed in the case of depression of the Share Setting key 625.

In the above described manner, the user can be notified in a comprehensible way that the share range can be set in association with the cloud printer registration processing for the CPS 320, which can thereby improve the convenience of registration.

<Modifications>

The second exemplary embodiment has been described above centering on the example case where the screen for changing the share range offered by the MFP 102 is displayed upon depression of the "Yes" key in the pop-up message 1401. However, the configuration is not limited thereto. In the registration sequence illustrated in FIG. 5, the web browser of the client terminal 101 establishes a login session with the cloud platform 300. The modification focuses on a state where the web browser has established a login session with the cloud platform 300. In a state where a login session has been established, the web browser can access each page offered by the CPS 320. Thus, the modification performs redirect processing for redirecting the screen displayed on the web browser to a setting screen related to the cloud print of the CPS 320.

FIG. 15 is a schematic diagram illustrating the modification. The modification illustrated in FIG. 15 is differentiated from the second exemplary embodiment in control performed upon depression of the "Yes" key. Upon reception of information indicating the depression of the "Yes" key, the remote UI service 415 generates redirect information for redirecting the screen to be displayed in the web browser of the client terminal 101 to a management page for managing the logical printers of the CPS 320. Subsequently, the remote UI service 415 transmits the generated redirect information to the client terminal 101.

Upon reception of the redirect information, the client terminal 101 requests the CPS 320 for the management page by using the URL for accessing the management page of the CPS 320 included in the redirect information.

In this case, since a login session has been established between the client terminal 101 and the CPS 320, access to the resources on the CPS 320 is successfully performed, thereby allowing the transition to the management page of the CPS 320. In such a manner, the user can move to the setting screen for setting the share range of the corresponding logical printer simply by operating a screen offered by the printing apparatus of which the share range is to be changed on the cloud print service. This makes it possible to improve the convenience in setting the share range of a printing apparatus in the cloud print service.

Although the exemplary embodiments have been described above centering on an example case where, when the MFP 102 issues various requests to the CPS 320, the MFP 102 directly transmits each request to the CPS 320, the configuration is not limited thereto. For example, in a case where the cloud platform 300 prepares a web application program interface (API) for referring to and operating data on the cloud service resources, the MFP 102 may call the API. In this case, by calling the API offered by the cloud platform 300, the MFP 102 can refer to and update the data resources managed by the CPS 320.

Although, in the above-described exemplary embodiments, a logical printer with an unset share range is displayed in the search result on the client terminal 101, the configuration is not limited thereto. For example, a logical printer with a share range unset may not be displayed on the client terminal 101. In this case, the CPS 320 is configured such that a logical printer with an unset share range is not extracted as a logical printer available for the user. Determination processing regarding whether to present a logical printer with an unset share range to the user may be provided as an operation setting for the CPS 320.

Although the exemplary embodiments have been described above using an example case where a device and a tenant are identified based on the cloud device ID and the cloud account, the configuration is not limited thereto. For example, the access token may include information for identifying the device ID and the cloud account. In this case, the CPS 320 identifies a logical printer and a tenant based on the access token included in a request by the MFP 102.

According to the above-described exemplary embodiments, the share range of the logical printer on the cloud print service can be set via a screen offered by a printing apparatus registered with the cloud print service. The user accordingly can change the share range of the corresponding logical printer simply by operating a screen offered by the printing apparatus of which the share range the user desires to change on the cloud print service. This makes it possible to improve the convenience in setting the share range of a printing apparatus in the cloud print service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2019-147442, filed Aug. 9, 2019, which is hereby incorporated by reference herein in its entirety.

What is claimed is:

1. A printing apparatus including a function of receiving print data from a cloud print service and performing printing, the printing apparatus comprising:
   at least one memory that stores a set of instructions; and
   at least one processor that executes the set of instructions, the set of instructions, when executed, causing the printing apparatus to perform operations comprising:
      in a case where the printing apparatus is registered with the cloud print service, providing a web browser of an external apparatus with data corresponding to a setting screen that sets an operation setting for the printing apparatus managed by the cloud print service;
      receiving data indicating the operation setting for the printing apparatus from the web browser of the external apparatus, wherein the data is transmitted to the printing apparatus based on a user operation via the setting screen; and
      transmitting, to the cloud print service, a request for changing the operation setting for the printing apparatus managed by the cloud print service based on the received data.

2. The printing apparatus according to claim 1, the operations further comprising:
   in a case where the printing apparatus is not registered with the cloud print service, providing the web browser of the external apparatus with data corresponding to a setup screen that receives a user operation for registering the printing apparatus to the cloud print service;
   transmitting a registration request for registering the printing apparatus with the cloud print service after receiving information transmitted from the web browser in response to receiving the user operation via the setup screen; and
   providing the web browser of the external apparatus with data for displaying a display object for notifying the user whether or not changing the setting for the cloud print service upon registration of the printing apparatus with the cloud print service as a printer to be used in the cloud print service.

3. The printing apparatus according to claim 2, the operations further comprising providing the web browser of the external apparatus with data corresponding to the setting screen related to the cloud print service upon receipt of information for changing the setting for the cloud print service transmitted from the web browser, the information corresponding to a user operation for the display object.

4. The printing apparatus according to claim 1, further comprising a Hypertext Transfer Protocol (HTTP) server function configured to provide a web browser of the external apparatus with an operation screen,
   wherein the data for displaying the setting screen is at least includes HTML (Hyper Text Markup Language) data, and
   wherein the request for changing the operation setting includes an access token for the cloud print service.

5. The printing apparatus according to claim 1, wherein the operation setting for the printing apparatus managed by the cloud print service is an operation setting indicating a user group permitted to the printing apparatus,
   the operations further comprising requesting the cloud print service for identification information to be used to set a user group sharing the printing apparatus,
   wherein the setting screen includes a display object for selecting a user group based on identification information obtained as a response to the request for the identification information.

6. The printing apparatus according to claim 5, wherein the request for the identification information and the request for changing the operation setting include information for identifying a tenant on the cloud print service.

7. The printing apparatus according to claim 6, wherein the information for identifying a tenant is an access token indicating a right to access resources on a specific tenant offered by the cloud print service.

8. The printing apparatus according to claim 4, wherein the access token is issued when the printing apparatus is registered with the cloud print service.

9. The printing apparatus according to claim 5,
   the operations further comprising, in a case where a predetermined request is received from the web browser of the external apparatus, providing the web browser of the external apparatus with data corresponding to a confirmation screen indicating a registration state of the cloud print service,
   wherein, in a case where the printing apparatus has been registered with the cloud print service, the confirmation screen displayed on the Web browser of the external apparatus includes information indicating a name used to identify the printing apparatus on the cloud print service and information indicating the user group sharing the printing apparatus.

10. A method for controlling a printing apparatus including a function of receiving print data from a cloud print service and performing printing, the method comprising:
   in a case where the printing apparatus is registered with the cloud print service, providing a web browser of an external apparatus with data corresponding to a setting screen that sets an operation setting for the printing apparatus managed by the cloud print service;
   receiving data indicating the operation setting for the printing apparatus from the web browser of the external apparatus, wherein the data is transmitted to the printing apparatus based on a user operation via the setting screen; and
   transmitting, to the cloud print service, a request for changing the operation setting for the printing apparatus managed by the cloud print service based on the received data.

11. A non-transitory computer-readable storage medium storing a program for causing a computer to execute a method for controlling a printing apparatus including a function of receiving print data from a cloud print service and performing printing, the method comprising:

in a case where the printing apparatus is registered with the cloud print service, providing a web browser of an external apparatus with data corresponding to a setting screen that sets an operation setting for the printing apparatus managed by the cloud print service;

receiving data indicating the operation setting for the printing apparatus from the web browser of the external apparatus, wherein the data is transmitted to the printing apparatus based on a user operation via the setting screen; and transmitting, to the cloud print service, a request for changing the operation setting for the printing apparatus managed by the cloud print service based on the received data.

12. A printing system for performing cloud printing by using a cloud print service, a cloud service for offering a management service for managing at least user resources to a user belonging to a tenant, a printing apparatus including a function of receiving a print job from the cloud print service and performing printing, and a client terminal, the printing apparatus comprising:
at least one memory that stores a set of instructions; and
at least one processor that executes the set of instructions, the set of instructions, when executed, causing the printing apparatus to perform operations comprising:
requesting the cloud print service for a list of identification information to be used to set a user group sharing the printing apparatus; and
in a case where the printing apparatus is registered with the cloud print service, providing the client terminal with data corresponding to a setting screen that sets an operation setting indicating a user group permitted to use the printing apparatus managed by the cloud print service, the client terminal comprising:
at least one memory that stores a set of instructions; and
at least one processor that executes the set of instructions, the set of instructions, when executed, causing the client terminal to perform operations comprising:
displaying the setting screen based on the data received from the printing apparatus; and
transmitting, to the printing apparatus, the data corresponding to the operation setting indicating the user group permitted to use the printing apparatus in response to receiving the user operation via the setting screen, wherein the instructions stored in the at least one memory of the printing apparatus further include instructions for transmitting, to the cloud print service, a change request for changing the operation setting indicating the user group permitted to use the printing apparatus, the operation setting being generated based on the data received from the client terminal on the cloud print service, the cloud print service comprising:
at least one memory that stores a set of instructions; and
at least one processor that executes the set of instructions, the set of instructions, when executed, causing the cloud print service to perform operations comprising:
acquiring, from the management service, a list of identification information for identifying a user group of a tenant which the printing apparatus identified based on the received first request belongs to;
transmitting the acquired list of identification information to the printing apparatus that has transmitted the request; and
changing, upon receipt of the change request, the operation setting indicating the user group sharing a logical printer corresponding to the printing apparatus.

13. The printing system according to claim 12, wherein the instructions stored in the at least one memory of the cloud print service further include instructions for providing, in a case where the printing apparatus is registered with the cloud print service, the client terminal with data corresponding to a second setting screen that sets an operation setting indicating a user group permitted to use the one printing apparatus managed by the cloud print service.

* * * * *